United States Patent
Shoshi et al.

(10) Patent No.: US 6,404,543 B1
(45) Date of Patent: Jun. 11, 2002

(54) INFRARED SHIELDING FILM

(75) Inventors: Satoru Shoshi, Koshigaya; Shigenobu Maruoka, Urawa, both of (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/562,065

(22) Filed: May 1, 2000

(30) Foreign Application Priority Data

May 14, 1999 (JP) ............................................ 11-134586

(51) Int. Cl.$^7$ ................................................ G02B 5/08
(52) U.S. Cl. ........................ 359/350; 359/359; 252/582; 252/587
(58) Field of Search ................................ 359/350, 359; 252/587, 582; 427/162, 164

(56) References Cited

U.S. PATENT DOCUMENTS

| | | | | |
|---|---|---|---|---|
| 4,373,020 A | * | 2/1983 | Winslow | 430/339 |
| 5,419,855 A | * | 5/1995 | Kikuta | 252/587 |
| 5,804,102 A | * | 9/1998 | Oi et al. | 359/350 |
| 5,807,511 A | * | 9/1998 | Kunimatsu et al. | 359/885 |

FOREIGN PATENT DOCUMENTS

| | | |
|---|---|---|
| JP | 57(1982)-59748 | 4/1982 |
| JP | 57(1982)-59749 | 4/1982 |
| JP | 7(1995)-100996 | 4/1995 |
| JP | 8(1996)-281860 | 10/1996 |
| JP | 9(1997)-108621 | 4/1997 |
| JP | 9(1997)-156025 | 6/1997 |

* cited by examiner

Primary Examiner—Cassandra Spyrou
Assistant Examiner—Christopher S Maxie
(74) Attorney, Agent, or Firm—Frishauf, Holtz, Goodman & Chick, P.C.

(57) ABSTRACT

An infrared shielding film comprising a transparent substrate film having, on one face thereof, at least an infrared shielding layer comprising a cured product of a coating layer which comprises (A) an ionizing radiation curing resin and (B) an infrared shielding agent comprising lanthanum in an amount of 0.1 to 20 parts by weight per 100 parts by weight of the ionizing radiation curing resin. The infrared shielding film maintains excellent transmission of visible light, effectively suppresses transmission of the sunlight and exhibits excellent scratch resistance, light resistance, durability and antifouling property.

18 Claims, No Drawings

INFRARED SHIELDING FILM

BACKGROUND OF THE INVENTION

1. Field of the Invention

The present invention relates to a novel infrared shielding film. More particularly, the present invention relates to an infrared shielding film which maintains excellent transmission of visible light, effectively suppresses transmission of the sunlight, exhibits excellent scratch resistance, light resistance, durability and antifouling property and are advantageously used for attaching to window panes and plastic boards for windows.

2. Description of Related Art

Plastic films have been used as films attached to window panes and plastic boards for windows for various purposes.

The sunlight coming into a room through a window pane contains ultraviolet light and infrared light in addition to visible light. Ultraviolet light contained in the sunlight causes sunburn and adverse effects of ultraviolet light on human bodies are recently mentioned. It is also well known that ultraviolet light causes degradation of packaging materials and deterioration of contents. Infrared light contained in the sunlight causes problems such as elevation of the room temperature by the light directly transmitted into the room and the efficiency of air conditioning during the summer time decreases. To prevent these undesirable phenomena, ultraviolet shielding films and infrared shielding films are attached to window panes and plastic boards for windows.

It is also generally practiced that films for preventing sight from the outside are attached to window panes and plastic boards for windows so that watching the inside of a room from the outside is made difficult. Films for preventing scattering of fragments are attached to window panes to prevent scattering of fragments of glass fractured in a disaster such as earthquake. The ultraviolet shielding films, the infrared shielding films and the films for preventing sight from the outside described above also exhibit the effect of preventing scattering of fragments.

The above films attached to window panes and plastic boards for windows (hereinafter, occasionally referred to as window films) generally have a scratch-resistant layer on the face thereof to provide the films with scratch resistance. The scratch-resistant layer is formed by coating the surface of the film with a resin of the ionizing radiation curing type such as a polyester acrylate resin, an epoxy acrylate resin, a urethane acrylate resin and a polyol acrylate resin and curing the resin.

Methods for providing windows of buildings, vehicles and refrigerated or freezing showcases with the property to reflect or absorb the heating radiation (infrared light) have been proposed to reduce heat and to save energy. For examples, films for reflection of heating radiation which have thin films of metals such as aluminum, silver and gold formed on the surface of transparent film substrates in accordance with the sputtering process or the vapor deposition process are attached to windows (Japanese Patent Application Laid-Open Nos. Showa 57(1982)-59748 and Showa 57(1982)-59749).

However, although the thin films formed in accordance with the sputtering process or the vapor deposition process have an excellent property for shielding heating radiation, these films have drawbacks in that the films has poor transparency and transmission of visible light through window panes decreases when the films are attached to window panes, that the films give reflection with metallic gloss and appearance becomes undesirable and that cost of production increases.

Recently, various infrared shielding films in which an infrared shielding layer comprising infrared shielding agents is disposed on a substrate film have been proposed to improve the above drawbacks (for example, Japanese Patent Application Laid-Open Nos. Heisei 7(1995)-100996, Heisei 8(1996)-281860, Heisei 9(1997)-108621 and Heisei 9(1997)-156025).

The infrared shielding agents used for the infrared shielding films can be divided into inorganic infrared shielding agents and organic infrared shielding agents. As the former inorganic infrared shielding agent, for example, metal oxides such as tin oxides, ATO (tin oxides doped with antimony) and ITO (indium oxides doped with tin) are well known. However, when an infrared shielding film is prepared by forming an infrared shielding layer using the oxide described above, the oxide must be used generally in an amount as great as 50 to 100 parts by weight per 100 parts by weight of a binder resin. As the result, problems arise in that workability during forming the infrared shielding layer deteriorates and that cost of production increases.

As the organic infrared shielding agent, for example, cyanine infrared shielding agents, phthalocyanine infrared shielding agents, naphthoquinone infrared shielding agents and anthraquinone infrared shielding agents are known. However, the organic infrared shielding agents have drawbacks in that these agents have inferior light resistance and durability and that these agents tend to be colored although the function of shielding infrared light is exhibited by the use in a smaller amount than that of inorganic infrared shielding agents.

From the standpoint of application, it is required for an infrared shielding film that the film shows excellent transmission of visible light and, at the same time, exhibits the function of effectively shielding light of wavelengths in the near infrared region which raises the temperature of the atmosphere.

SUMMARY OF THE INVENTION

The present invention has an object of providing an infrared shielding film which maintains excellent transmission of visible light, effectively suppresses transmission of the sunlight, exhibits excellent scratch resistance, light resistance, durability and antifouling property and are advantageously used for attaching to window panes and plastic boards for windows.

As the result of intensive studies by the present inventors to develop an infrared shielding film having the above excellent properties, it was found that the above object can be achieved by a film comprising an infrared shielding film which is prepared by coating one face of a transparent substrate film with a coating liquid which comprises a resin of the ionizing radiation curing type, a specific type of infrared shielding agent in a specific amount and, optionally, a silicone resin of the ionizing radiation curing type, followed by curing the formed coating layer by irradiation of an ionizing radiation. The present invention has been completed based on this knowledge.

The present invention provides:

(1) An infrared shielding film comprising a transparent substrate film having, on one face thereof, at least an infrared shielding layer comprising a cured product of a coating layer which comprises (A) a resin of an ionizing radiation curing type and (B) an infrared shielding agent comprising a rare earth metal in an amount of 0.1 to 20 parts by weight per 100 parts by weight of the resin of an ionizing radiation curing type;

(2) An infrared shielding film described in (1), wherein the coating layer further comprises (C) a silicone resin of an ionizing radiation curing type;

(3) An infrared shielding film described in any of (1) and (2), wherein the infrared shielding layer has a thickness of 0.5 to 10 μm; and (4) An infrared shielding film described in any of (1), (2) and (3), wherein the resin curable by ionizing radiation of component (A) comprises a photopolymerizable prepolymer as a basic component.

DESCRIPTION OF THE PREFERRED EMBODIMENTS

The transparent substrate film used for the infrared shielding film of the present invention is not particularly limited and a suitable film can be selected from various types of transparent plastic films in accordance with the situation. Examples of the transparent plastic film include films of polyolefin resins such as polyethylene, polypropylene, poly-4-methylpentene-1 and polybutene-1; polyester resins such as polyethylene terephthalate and polyethylene naphthalate; polycarbonate resins; polyvinyl chloride resins; polyphenylene sulfide resins; polyether sulfone resins; polyethylene sulfide resins; polyphenylene ether resins; styrene resins; acrylic resins; polyamide resins; polyimide resins and cellulose resins such as cellulose acetate; and laminate films of these films. Among these films, films of polyethylene terephthalate are preferable.

The thickness of the transparent substrate film is not particularly limited and can be suitably selected in accordance with the application. The thickness is generally in the range of 5 to 200 μm and preferably in the range of 10 to 100 μm.

The transparent substrate film may be colored or may have a vapor deposited layer, where desired. The transparent substrate film may also contain antioxidants and ultraviolet absorbents. One or both surfaces of the transparent substrate film may have an oxidation treatment or may be made rough, where desired, to enhance adhesion of the surfaces to layers formed thereon. Examples of the oxidation treatment include treatments using corona discharge, chromic acid (a wet process), flame, hot air or ozone and ultraviolet light. Examples of the method of making the surface rough include treatments of sand blast and treatments using solvents. The method of the surface treatment can be suitably selected in accordance with the type of the substrate film. In general, the treatment using corona discharge is preferable from the standpoint of the effect and operability.

In the infrared shielding film of the present invention, at least an infrared shielding layer is formed on one face of the transparent substrate film. The infrared shielding layer comprises a cured product of a coating layer comprising (A) a resin of the ionizing radiation curing type, (B) an infrared shielding agent comprising a rare earth metal and, optionally, (C) a silicone resin of the ionizing radiation curing type.

The resin of the ionizing radiation curing type of component (A) is a resin which is used for forming a scratch-resistant layer having excellent scratch resistance and can be cured by irradiation of ultraviolet light or electron beams. Among various types of resins of the ionizing radiation curing type, resins of the ultraviolet curing type frequently used for forming scratch-resistant layers on films attached to the inner face of window panes are preferable. The resin of the ultraviolet curing type is not particularly limited and can be suitably selected from conventional resins of the ultraviolet curing type. The resin of the ultraviolet curing type generally contains a photopolymerizable prepolymer as the main component and, where desired, photopolymerizable monomers and photopolymerization initiators. The photopolymerizable prepolymer may be a photopolymerizable prepolymer of the radical polymerization type or a photopolymerizable prepolymer of the cationic polymerization type. Examples of the photopolymerizable prepolymer of the radical polymerization type include photopolymerizable prepolymers of the polyester acrylate type, the epoxy acrylate type, the urethane acrylate type and the polyol acrylate type. The photopolymerizable prepolymer of the polyester acrylate type can be obtained, for example, by condensation of a polybasic carboxylic acid with a polyhydric alcohol to obtain a polyester oligomer having hydroxyl groups at both ends, followed by esterification of the hydroxyl groups in the obtained polyester oligomer with (meth)acrylic acid; or by addition of an alkylene oxide to a polybasic carboxylic acid to obtain an oligomer, followed by esterification of the hydroxyl groups in the obtained oligomer with (meth)acrylic acid. The photopolymerizable prepolymer of the epoxy acrylate type can be obtained, for example, by reaction of the oxirane ring in an epoxy resin of the bisphenol type or the novolak type having a relatively low molecular weight with (meth)acrylic acid for esterification. The photopolymerizable prepolymer of the urethane acrylate type can be obtained, for example, by reaction of a polyether polyol or a polyester polyol with a polyisocyanate to obtain a polyurethane oligomer, followed by esterification of the obtained polyurethane oligomer with (meth)acrylic acid. The photopolymerizable prepolymer of the polyol acrylate type can be obtained, for example, by esterification of hydroxyl groups in a polyether polyol with (meth)acrylate. A single type or a combination of two or more types of the photopolymerizable prepolymer may be used.

As the photopolymerizable prepolymer of the cationic polymerization type, epoxy resins are generally used. Examples of the epoxy resin include compounds obtained by epoxidation of polyhydric phenols such as bisphenol resins and novolak resins with epichlorohydrin or the like and compounds obtained by oxidation of linear olefin compounds or cyclic olefin compounds with peroxides or the like.

Examples of the photopolymerizable monomer include 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicylopentenyl di(meth)acrylate modified with caprolactone, phosphoric acid di(meth)acrylate modified with ethylene oxide, cyclohexyl di(meth)acrylate modified with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl)isocyanurate, dipentaerythritol penta(meth)acrylate modified with propionic acid, dipentaerythritol hexa(meth)acrylate and dipentaerythritol hexa(meth)acrylate modified with caprolactone. A single type or a combination of two or more types of the photopolymerizable monomer may be used. The amount of the photopolymerizable monomer is generally 0 to 40 parts by weight and preferably 4 to 20 parts by weight per 100 parts by weight of the photopolymerizable prepolymer.

Examples of the photopolymerization initiator used for the photopolymerizable prepolymer of the radical polymerization type include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholinopropane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methyl-anthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylamine benzoate. Examples of the photopolymerization initiator for the photopolymerizable prepolymer of the cationic polymerization type include compounds comprising combinations of oniums such as aromatic sulfonium ions, aromatic oxosulfonium ions and aromatic iodonium ions and anions such as tetrafluoroborate ion, hexafluorophosphate ion, hexafluoroantimonate ion and hexafluoroarsenate ion. A single type or a combination of two or more types of the photopolymerization initiator may be used. The amount of the photopolymerization initiator is generally selected in the range of 0.2 to 10 parts by weight per 100 parts by weight of the photopolymerizable prepolymer.

The infrared shielding agent comprising a rare earth metal of component (B) is not particularly limited as long as the agent comprises a rare earth metal and has the property to effectively shield infrared light, in particular, light of wavelengths in the near infrared region. Any of inorganic infrared shielding agents and organic infrared shielding agents can be used. Examples of the rare earth metal include Sc, Y and lanthanoids which are, specifically, La, Ce, Pr, Nd, Pm, Sm, Eu, Gd, Tb, Dy, Ho, Er, Tm, Yb and Lu. A single type or two or more types of the rare earth metal may be comprised. Examples of the organic infrared shielding agent comprising a rare earth metal include phthalocynanine compounds in which the central atom is the above rare earth metal.

In the present invention, it is necessary that the infrared shielding agent comprising a rare earth metal of component (B) is used in an amount of 0.1 to 20 parts by weight per 100 parts by weight of the resin of the ionizing radiation curing type of component (A). When the amount is less than 0.1 part by weight, the effect of shielding infrared light is not sufficient. When the amount exceeds 20 parts by weight, the effect does not increase to the degree expected from the used amount. Moreover, workability deteriorates and economic disadvantage arises. From the standpoint of the balance between the effect of shielding infrared light, workability and economy, it is preferable that the infrared shielding agent comprising a rare earth metal is used in an amount in the range of 0.5 to 10 parts by weight and more preferably 1 to 5 parts by weight.

In the present invention, the above infrared shielding agent comprising a rare earth metal may be used singly or in combination of two or more. Other inorganic or organic infrared shielding agents may be used in combination, where necessary.

Examples of the other inorganic infrared shielding agent include titanium oxide, zinc oxide, indium oxides, tin oxides and zinc sulfide Among these compounds, oxides such as tin oxides, ATO (tin oxides doped with antimony) and ITO (indium oxides doped with tin) are preferable. Examples of the other organic infrared shielding agent include cyanine compounds, squalylium compounds, thiol nickel complex compounds, phthalocyanine compounds, triallylmethane compounds, naphthoquinone compounds, anthraquinone compounds and amino compounds such as N,N,N',N'-tetrakis(p-di-n-butylaminophenyl)-p-phenylenediaminium perchlorate, phenylenediaminium chlorate, phenylenediaminium hexafluoroantimonate, phenylenediaminium fluoroborate, phenylene-diaminium fluorate and phenylenediaminium perchlorate.

When an inorganic infrared shielding agent is used, it is preferable that the inorganic infrared shielding agent has a particle diameter of 0.5 $\mu$m or less and more preferably 0.1 $\mu$m or less so that a coating layer showing smaller absorption of light in the visible region and excellent transparency is formed.

In the present invention, where necessary, a silicone resin of the ionizing radiation curing type may be used as component (C) to provide the infrared shielding film with functions such as the antifouling property, the cleaning property and the slipping property. As the silicone resin of the ionizing radiation curing type, silicone resins of the ultraviolet curing type are preferable. Examples of such resins include silicone resins of the radical addition type having an alkenyl group and mercapto group in the molecule, silicone resins of the hydrosilylation reaction type having an alkenyl group and hydrogen atom in the molecule, silicone resins of the cationic polymerization type having epoxy group in the molecule and silicone resins of the radical polymerization type having (meth)acrylic group in the molecule. Among these silicone resins, the silicone resins of the cationic polymerization type having epoxy group in the molecule and the silicone resins of the radical polymerization type having (meth)acrylic group in the molecule are preferable.

Examples of the silicone resin having epoxy group or (meth)acrylic group in the molecule include polydimethylsiloxane having epoxypropoxypropyl groups at the ends, copolymers of (epoxycyclohexyl-ethyl)methylsiloxane and dimethylsiloxane, polydimethylsiloxane having methacryloxypropyl groups at the ends and polydimethylsiloxane having acryloxypropyl groups at the ends.

Examples of the silicone resin having vinyl group in the molecule include polydimethylsiloxane having vinyl groups at the ends and homopolymer of vinylmethylsiloxane.

In the present invention, a single type or a combination of two or more types of the silicone resin of the ionizing radiation curing type of component (C) may be used. The amount of the silicone resin of the ionizing radiation curing type is generally selected in the range of 0.1 to 50 parts by weight per 100 parts by weight of the resin of the ionizing radiation curing type of component (A). When the amount is less than 0.1 part by weight, there is the possibility that the antifouling property, the cleaning property and the slipping property are not sufficiently provided. When the amount exceeds 50 parts by weight, the curing property and scratch resistance deteriorate. When the antifouling property, the cleaning property, the slipping property, the curing property and scratch resistance are taken into consideration, the amount of component (C) is preferably in the range of 0.5 to 30 parts by weight and more preferably in the range of 1 to 20 parts by weight.

By using the above reactive silicone resin, the silicone resin is crosslinked within itself by the curing reaction. Moreover, the silicone resin and the resin of the ionizing radiation curing type of component (A) are occasionally crosslinked together. Therefore, bleeding out of the silicone resin with time is suppressed and the functions provided by the silicone resin are maintained for a long time.

The infrared shielding layer in the present invention comprises a cured product of the coating layer comprising component (A), component (B) and, optionally, component (C) described above. The infrared shielding layer may further comprise ultraviolet absorbents, light stabilizers, antioxidants, inorganic fillers and coloring agents, where desired, within a range such that the object of the present invention is not adversely affected.

The thickness of the infrared shielding layer is selected generally in the range of 0.5 to 10 μm and preferably in the range of 0.8 to 8 μm.

The infrared shielding layer can be formed efficiently in accordance with the following process.

In the process of the present invention, component (A), component (B) and, optionally, component (C) described above and various additives used where desired (including polymerization initiators) are added to a solvent which is used where necessary and dispersed or dissolved in the solvent to prepare a homogeneous coating agent.

Examples of the solvent include aliphatic hydrocarbons such as hexane, heptane and cyclohexane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanone and isophorone; esters such as ethyl acetate and butyl acetate; and cellosolve solvents such as ethylcellosolve. When an inorganic infrared absorbent is used, a dispersant may be used to obtain a homogeneous dispersion and the dispersion can be prepared using a disperser such as a sand mill, an attritor, a colloid mill, a ball mill and a high pressure homogenizer. Examples of the dispersant include anionic surfactants such as salts of carboxylic acids, salts of sulfonic acids, ester salts of sulfuric acid, ester salts of phosphoric acid and salts of phosphonic acid and nonionic surfactants such as polyoxyethylene alkyl ethers, polyoxyethylene alkylphenol ethers, polyoxyethylene alkyl esters and sorbitan alkyl esters.

Concentration and viscosity of the prepared coating agent are not particularly limited as long as the coating can be performed and can be suitably selected in accordance with the situation.

The above coating agent is applied to one face of the transparent substrate film in accordance with a conventional process such as bar coating, knife coating, roll coating, blade coating, die coating and gravure coating to form a coating layer. The coating layer is then dried and cured by irradiation of an ionizing radiation to form the infrared shielding layer.

Examples of the ionizing radiation include ultraviolet light and electron beams. The ultraviolet light can be obtained from a high pressure mercury lamp, a fusion H lamp or a xenon lamp. The electron beams can be obtained from an electron accelerator. Among these ionizing radiations, ultraviolet light is preferable. When electron beams are used, the cured film can be obtained without using a polymerization initiator.

In the present invention, a layer of a primer may be formed between the infrared shielding layer and the substrate film to enhance adhesion between the infrared shielding layer and the substrate film. The primer is not particularly limited and a conventional primer such as an acrylic primer, a polyester primer, a polyurethane primer, a silicone primer or a rubber primer can be used. From the standpoint of durability and adhesion, an acrylic primer and a polyester primer are preferable. The primer may contain ultraviolet absorbents and light stabilizers, where necessary. The thickness of the primer is preferably in the range of 0.1 to 10 μm and more preferably in the range of 0.5 to 5 μm from the standpoint of uniform coating and tight adhesion.

In the infrared shielding film of the present invention, a release liner may be disposed on the face of the transparent substrate film opposite to the face having the infrared shielding layer via an adhesive layer, where desired.

The adhesive forming the adhesive layer is not particularly limited and a suitable adhesive may be selected from various conventional adhesives in accordance with the situation. Acrylic adhesives, urethane adhesives and silicone adhesives are preferable from the standpoint of weatherability. The thickness of the adhesive layer is generally in the range of 5 to 100 μm and preferably in the range of 10 to 60 μm.

Examples of the release liner disposed on the above adhesive layer include sheets obtained by coating paper such as glassine paper, coated paper and laminate paper and various plastic films with releasing agents such as silicone resins. The thickness of the release liner is not particularly limited and generally about 20 to 150 μm. The above adhesive layer may contain ultraviolet absorbents and light stabilizers, where necessary.

The infrared shielding film of the present invention is advantageously used as a film attached to the inner face of window panes and plastic boards for windows. When the film is used, the release liner is removed and the remaining film is attached in a manner such that the adhesive layer is attached to the object article.

To summarize the advantages obtained by the present invention, the infrared shielding film maintains excellent transmission of visible light, effectively suppresses transmission of the sunlight and infrared light, exhibits excellent scratch resistance, light resistance, durability and antifouling property and are advantageously used for attaching to window panes and plastic boards for windows.

EXAMPLES

The present invention will be described more specifically with reference to examples in the following. However, the present invention is not limited to the examples.

Physical properties of the infrared shielding films prepared in the examples were evaluated in accordance with the following methods.

(1) Haze

The haze was evaluated in accordance with the method of Japanese Industrial Standard K 7105 using a haze meter manufactured by NIPPON DENSHOKU KOGYO Co., Ltd.

(2) Transmittance of visible light

The transmittance of visible light was measured in accordance with the method of Japanese Industrial Standard R3106 using a spectrophotometer manufactured by SHIMADZU Corporation.

(3) Transmittance of the sunlight

The transmittance of the sunlight was measured in accordance with the method of Japanese Industrial Standard R3106 using a spectrophotometer manufactured by SHIMADZU Corporation.

(4) Pencil hardness

The pencil hardness was measured in accordance with the method of Japanese Industrial Standard K 5400 using a pencil scratch tester manufactured by TOYO SEIKI Co., Ltd.

(5) Steel wool hardness

The surface of a sample was rubbed with steel wool No. 0000 in 10 reciprocal movements under a load of about 1 kg. The result of the examination was evaluated as follows: 5 when no scratches were formed on the surface of the sample; 1 when scratches were formed to about the same degree as that formed on the surface of a polyethylene terephthalate film; 2 to 4 when scratches were formed to an intermediate degree; and the smaller the number, the greater the scratches.

(6) Transmittance of infrared light

The transmittance of infrared light was measured using a spectrophotometer manufactured by SHIMADZU Corporation. From the obtained chart of transmittance, the transmittance at 960 nm was obtained and used as the transmittance of infrared light.

Example 1

A resin of the ultraviolet curing type (manufactured by DAINICHI-SEIKA COLOR AND CHEMICALS MFG. Co., Ltd.; trade name: SEIKA-BEAM EXF-01L; a multifunctional acrylate containing a radical photo-polymerization initiator) in an amount of 100 parts by weight, 2.2 parts by weight (as the amount of the solid component) of isobutanol dispersion of an infrared shielding agent containing lanthanum (manufactured by SUMITOMO KINZOKU KOZAN Co., Ltd., trade name: KHF-4) and 55.5 parts by weight of ethylcellosolve were mixed together and a homogeneous coating agent having a concentration of the solid components of 40% by weight was prepared.

One face of a polyester film having a thickness of 50 $\mu$m (manufactured by TORAY INDUSTRIES Inc.; trade name: LUMIRROR T-70) was coated with the above coating agent by a Mayer bar in a manner such that the coating layer had a thickness of 2.2 $\mu$m after being cured. The coating layer was dried at 80° C. for 1 minutes and then cured by irradiation of ultraviolet light (the amount of light: 250 mJ/cm$^2$) using an apparatus for irradiation of ultraviolet light (manufactured by EYE GRAPHICS Co., Ltd.; model No. UB042-5AM-W) to prepare an infrared shielding film. The properties of the prepared infrared shielding film are shown in Table 1.

Example 2

An infrared shielding film was prepared in accordance with the same procedures as those conducted in Example 1 except that ADEKA OPTOMER KR566 (manufactured by ASAHI DENKA KOGYO Co., Ltd.; a trade name; a multifunctional epoxy resin containing a cationic photopolymerization initiator) was used in place of SEIKA BEAM EXF-01L. The properties of the prepared film are shown in Table 1.

Example 3

An infrared shielding film was prepared in accordance with the same procedures as those conducted in Example 1 except that the thickness of the cured coating layer was adjusted to 2.8 $\mu$m. The properties of the prepared film are shown in Table 1.

Comparative Example 1

A resin of the ultraviolet curing type (SEIKA BEAM EXF-01L described above) in an amount of 100 parts by weight and 75 parts by weight (as the amount of the solid component) of methyl ethyl ketone dispersion of tin oxides doped with about 10% by weight (based on the tin oxides) of antimony (manufactured by ISHIHARA TECHNO Co., Ltd.; trade name: SN-100P(MEK)) were mixed together and ethylcellosolve was added to the resultant mixture in an amount such that the concentration of the solid components was about 40% by weight. The prepared mixture was stirred and a homogeneous coating agent was prepared.

Subsequently, in accordance with the same procedures as those conducted in Example 1, an infrared shielding film having a thickness of the cured coating layer of 2.0 $\mu$m was prepared. The properties of the prepared infrared shielding film are shown in Table 1.

Comparative Example 2

An infrared shielding film was prepared in accordance with the same procedures as those conducted in Comparative Example 1 except that the thickness of the cured coating layer was adjusted to 3.0 $\mu$m. The properties of the prepared film are shown in Table 1.

Example 4

A homogeneous coating agent having a concentration of the solid components of about 40% by weight was prepared and an infrared shielding film was prepared from the prepared coating agent in accordance with the same procedures as those conducted in Example 1 except that 3 parts by weight of a silicone resin of the ultraviolet curing type (manufactured by SHIN-ETSU CHEMICAL Co., Ltd.; trade name: SILICONE X-62-5408; an epoxy-modified silicone resin of the cationic polymerization type) and 0.1 part by weight of a cationic photopolymerization initiator (manufactured by SHIN-ETSU CHEMICAL Co., Ltd.; trade name: CAT-7603) were further added and the amount of ethylcellosolve was changed. The properties of the prepared infrared shielding film are shown in Table 1.

The contact angle of water was measured in accordance with the static drop method using a contact angle meter manufactured by KYOWA INTERFACE SCIENCE Co., Ltd. and was found to be 99 degrees. Thus, the infrared shielding film had the excellent antifouling property. (The contact angle of water of the infrared shielding film obtained in Example 1 was 81 degrees.)

TABLE 1

| Example | 1 | 2 | 3 | 4 | | |
|---|---|---|---|---|---|---|
| Comparative Example | | | | | 1 | 2 |
| Haze (%) | 1.1 | 1.3 | 1.2 | 1.2 | 1.2 | 1.4 |
| Transmittance of visible light (%) | 82 | 81 | 79 | 80 | 84 | 83 |
| Transmittance of the sunlight (%) | 69 | 70 | 66 | 70 | 81 | 78 |
| Transmittance of infrared light (%) | 55 | 56 | 45 | 54 | 84 | 82 |
| Pencil hardness | 2H | 2H | 2H | 2H | 2H | 2H |
| Steel wool hardness | 5 | 5 | 5 | 5 | 5 | 5 |

What is claimed is:

1. An infrared shielding film comprising a transparent substrate film having, on one face thereof, at least an infrared shielding layer comprising a cured product of a coating layer which comprises (A) an ionizing radiation curing resin and (B) an infrared shielding agent comprising lanthanum in an amount of 0.1 to 20 parts by weight per 100 parts by weight of the ionizing radiation curing resin, the infrared shielding agent having a particle diameter of 0.5 μm or less.

2. An infrared shielding film according to claim 1, wherein the coating layer further comprises (C) an ionizing radiation curing silicone resin.

3. An infrared shielding film according to claim 1, wherein the infrared shielding layer has a thickness of 0.5 to 10 μm.

4. An infrared shielding film according to claim 2, wherein the infrared shielding layer has a thickness of 0.5 to 10 μm.

5. An infrared shielding film according to claim 1, wherein the ionizing radiation curing resin of component (A) comprises a photopolymerizable prepolymer as a basic component.

6. An infrared shielding film according to claim 2, wherein the ionizing radiation curing resin of component (A) comprises a photopolymerizable prepolymer as a basic component.

7. An infrared shielding film according to claim 3, wherein the ionizing radiation curing resin of component (A) comprises a photopolymerizable prepolymer as a basic component.

8. An infrared shielding film according to claim 4, wherein the ionizing radiation curing resin of component (A) comprises a photopolymerizable prepolymer as a basic component.

9. An infrared shielding film according to claim 1, wherein the transparent substrate film is a film of a resin selected from the group consisting of a polyolefin resin, a polyester resin, a polycarbonate resin, a polyvinyl chloride resin, a polyphenylene sulfide resin, a polyether sulfone resin, a polyethylene sulfide resin, a polyphenylene ether resin, a styrene resin, an acrylic resin, a polyamide resin, a polyimide resin and a cellulose resin.

10. An infrared shielding film according to claim 1, wherein the transparent substrate film is a film of a resin selected from the group consisting of polyethylene, polypropylene, poly-4-methylpentene-1, polybutene-1, polyethylene terephthalate, polyethylene naphthalate and cellulose acetate.

11. An infrared shielding film according to claim 1, wherein the transparent substrate film comprises polyethylene terephthalate.

12. An infrared shielding film according to claim 9, wherein the transparent substrate film has a thickness of 5 to 200 μm.

13. An infrared shielding film according to claim 10, wherein the transparent substrate film has a thickness of 10 to 100 μm.

14. An infrared shielding film according to claim 1, wherein the infrared shielding agent is in an amount of 0.5 to 10 parts by weight per 100 parts by weight of the ionizing radiation curing resin.

15. An infrared shielding film according to claim 13, wherein the infrared shielding agent is in an amount of 1 to 5 parts by weight per 100 parts by weight of the ionizing radiation curing resin.

16. An infrared shielding film according to claim 15, wherein the infrared shielding agent has a particle diameter of 0.1 μm or less.

17. An infrared shielding film according to claim 1, wherein the infrared shielding layer has a thickness of 0.8 to 8 μm.

18. An infrared shielding film according to claim 2, wherein the silicone resin is in an amount of 0.1 to 50 parts by weight per 100 parts by weight of the ionizing radiation curing resin.

\* \* \* \* \*